US008610007B2

United States Patent
Chen

(10) Patent No.: US 8,610,007 B2
(45) Date of Patent: Dec. 17, 2013

(54) PORTABLE ELECTRONIC DEVICE AND METHOD FOR MEASURING OBJECT WEIGHT USING THE PORTABLE ELECTRONIC DEVICE

(75) Inventor: Jian-Ping Chen, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 488 days.

(21) Appl. No.: 12/947,730

(22) Filed: Nov. 16, 2010

(65) Prior Publication Data

US 2011/0297455 A1 Dec. 8, 2011

(30) Foreign Application Priority Data

Jun. 4, 2010 (CN) .......................... 2010 1 0192068

(51) Int. Cl.
*G01G 19/52* (2006.01)
*G01G 19/414* (2006.01)

(52) U.S. Cl.
USPC .................. 177/25.13; 177/25.15; 178/18.01

(58) Field of Classification Search
USPC ....................... 178/18.01; 177/1, 25.13, 25.15
See application file for complete search history.

(56) References Cited

U.S. PATENT DOCUMENTS

| 4,366,873 | A | * | 1/1983 | Levy et al. | 177/25.19 |
| 4,576,244 | A | * | 3/1986 | Zeigner et al. | 177/245 |
| 4,605,080 | A | * | 8/1986 | Lemelson | 177/4 |
| 5,541,372 | A | * | 7/1996 | Baller et al. | 178/18.01 |
| 5,750,937 | A | * | 5/1998 | Johnson et al. | 177/25.11 |
| 7,186,930 | B1 | * | 3/2007 | Wong et al. | 177/25.13 |
| 7,547,851 | B1 | * | 6/2009 | Wong | 177/25.13 |
| 8,169,332 | B2 | * | 5/2012 | Son | 340/665 |
| 2004/0003947 | A1 | * | 1/2004 | Kesselman et al. | 177/25.13 |
| 2012/0181091 | A1 | * | 7/2012 | Lieu | 177/1 |

FOREIGN PATENT DOCUMENTS

| CN | 101448035 | 6/2009 |
| CN | 101692680 | 4/2010 |

* cited by examiner

*Primary Examiner* — Randy W Gibson
(74) *Attorney, Agent, or Firm* — Altis & Wispro Law Group, Inc.

(57) ABSTRACT

An object is weighed using a portable electronic device. Placement of an object on a touch panel of the portable electronic device provides measurement of the weight of the object. In the measurement, the portable electronic device sends information to the touch panel to request a user to input a unit price of the object. The portable electronic device then detects a weight of the object placed on the touch panel. The portable electronic device calculates a total price of the object by multiplication of the input unit price and the detected weight of the object. The total price of the object can be then output.

15 Claims, 2 Drawing Sheets

PORTABLE ELECTRONIC DEVICE AND METHOD FOR MEASURING OBJECT WEIGHT USING THE PORTABLE ELECTRONIC DEVICE

BACKGROUND

1. Technical Field

Embodiments of the present disclosure relate to weight measurement, and more particularly to a portable electronic device and method for measuring weight using the portable electronic device.

2. Description of Related Art

Various electronic scales are commercially available, providing digital or other readout of the weight of an object placed on a pan of the scale. However, the various scales are usually far too large to be easily transported. What is needed, therefore, is a device and method for measuring weight that can overcome the limitations described.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of application instructions, written in a programming language, such as, for example, Java, C, or Assembly. One or more application instructions in the module may be embedded in firmware, such as an EPROM. It will be appreciated that module may comprise connected logic units, such as gates and flip-flops, and may comprise programmable units, such as programmable gate arrays or processors. The module described herein may be implemented as either application and/or hardware module and may be stored in any type of computer-readable medium or other computer storage device.

Figure 1:
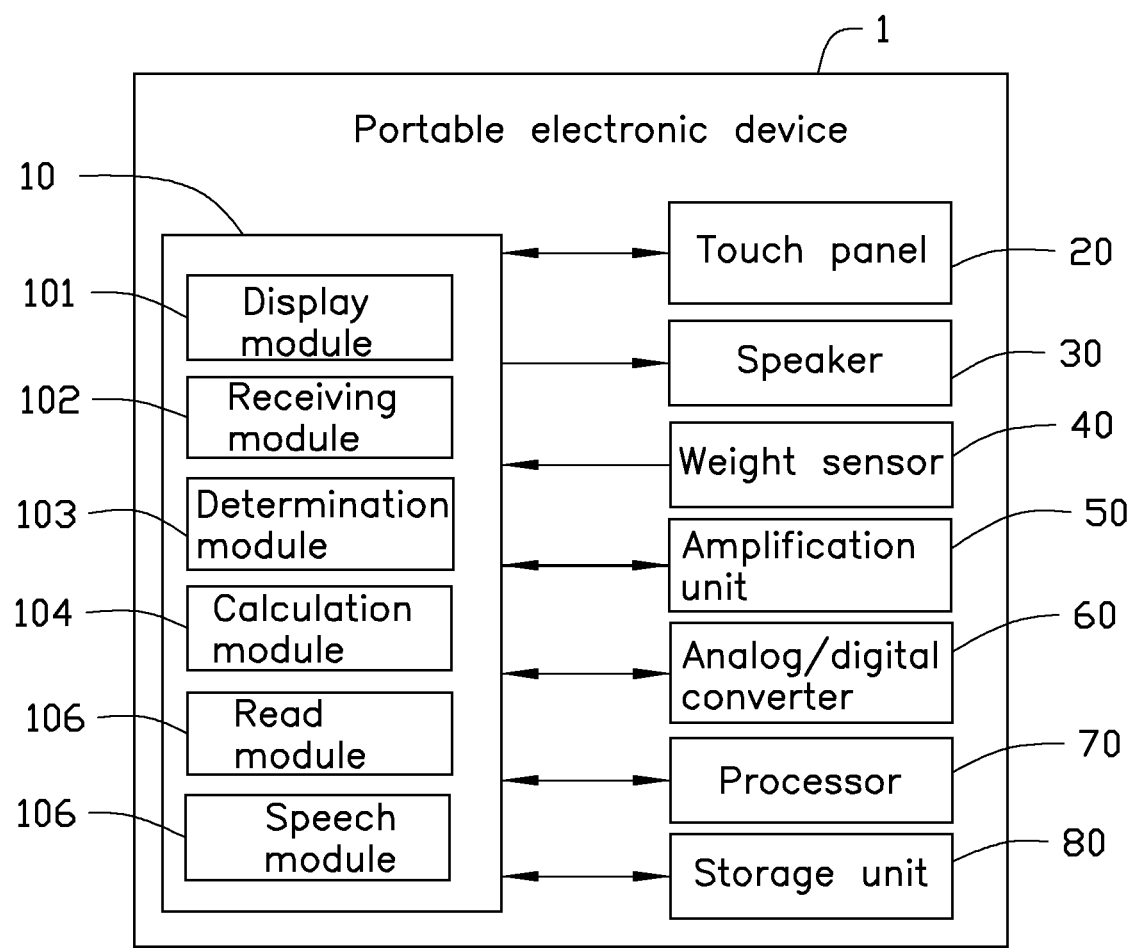
FIG. 1 is a block diagram of one embodiment of a portable electronic device.

FIG. 1 is a block diagram of one embodiment of a portable electronic device 1. The portable electronic device 1 may be a mobile phone, a personal digital assistant (PDA), a handheld game console, a digital camera (DC), a Tablet PC, handheld computer, or other device. The portable electronic device 1 includes a system 10, a touch panel 20, a speaker 30, a weight sensor 40, an amplification unit 50, an analog/digital converter 60, at least one processor 70, and a storage unit 80. The system 10 includes one or more programs including a display module 101, a receiving module 102, a determination module 103, a calculation module 104, a read module 105 and a speech module 106. The system 10 can detect the weight of an object using the portable electronic device 1, calculate a total price of the object by multiplication of a unit price and the weight of the object and output the result through the speaker 30.

The portable electronic device 1 is generally controlled and coordinated by an operating system application, such as UNIX, LINUX, WINDOWS, MAC OS X, an embedded operating system, or any other compatible operating systems. In other embodiments, the portable electronic device 1 may be controlled by a proprietary operating system. Conventional operating systems control and schedule computer processes for execution, perform memory management, provide file system, networking, and I/O services, and provide a user interface, such as a graphical user interface (GUI), among other things.

The touch panel 20 is operable to display information related to the unit price of the object and the total price of the object of the portable electronic device 1. The touch panel 14 can be a resistive touch screen, or a capacitive touch screen.

The speaker 30 is operable to output audio data from the system 10.

The weight sensor 40 is operable to detect the weight of an object placed on the touch panel 20. In one embodiment, the weight sensor 40 is a pressure sensor connected to the touch panel 20. When the object is placed on the touch panel 20, the pressure sensor can determine the weight of the object to generate a signal linearly proportional to the weight of the object. Furthermore, the weight sensor 40 sends the signal indicative of the weight of the object to the amplification unit 50.

The amplification unit 50 is operable to amplify the signal received from the weight sensor 40 to an amplified signal. The amplification unit 50 further sends the amplified signal to the analog/digital converter 60.

The analog/digital converter 60 is operable to transform the amplified signal to a digital signal. The digital signal is then saved in the storage unit 80.

The storage unit 80 is electronically connected to the touch panel 20, the speaker 30, the weight sensor 40, the amplification unit 50, the analog/digital converter 60, at least one processor 70 and a system 10. The storage unit 80 is operable to store many kinds of data, such as the weight and the unit price of objects to be weighed, a language database, a customization function code of the portable electronic device 1, computerized codes of the system 10, programs of an operating system and other applications of the portable electronic device 1. The storage unit 80 may include a hard disk drive, flash memory, RAM, ROM, cache, or external storage media.

The modules 101-106 may comprise computerized codes in the form of one or more programs that are stored in the storage unit 80 (or memory). The computerized codes include instructions executed by the at least one processor 70 to provide functions for modules 101-106. The at least one processor 70, as an example, may include a CPU, math coprocessor, or shift register, for example.

The display module 101 is operable to send information to the touch panel 20 requesting a user to input a unit price of the object, such as a value containing a decimal point. In addition, the display module 101 is also operable to send information to the touch panel 20 requesting placement of the object on the touch panel 20 for measurement.

The receiving module 102 is operable to receive the input unit price of the object and save the unit price of the object to the storage unit 80. Furthermore, the receiving module 102 further saves the digital signal from the analog/digital converter 60 in the storage unit 80.

The determination module 103 is operable to determine whether the unit price of the object input by the user is a non-zero value. If the unit price of the object input by the user is the non-zero value, the determination module 103 sends a calculation signal to the calculation module 104 to execute a calculation.

The calculation module 104 is operable to calculate a total price of the object. The total price of the object is calculated by multiplication of the unit price by the weight of the object. In one embodiment, the calculation module 104 further saves the calculated total price of the object in the storage unit 80. In other embodiments, the calculation module 104 can send the calculated total price of the object to the display module 101. The display module 101 then displays the calculated total price of the object on the touch panel 20.

The read module 105 is operable to read the total price and the weight of the object from the storage unit 80. The read module 105 is further operable to read the audio file corresponding to the total price and the weight of the object from the storage unit 80 and output the audio file to the speech module 106. For example, the weight and the total price of the object read from the storage unit 80 are 1.5 kg and 150 dollars. The read module 105 reads the audio file corresponding to the 1.5 kg and 150 dollars from the storage unit 80 and outputs the file to the speech module 106.

The speech module 106 is operable to receive the audio file corresponding to the total price and the weight of the object from the read module 105 and output the audio file to the speaker 30.

Figure 2:
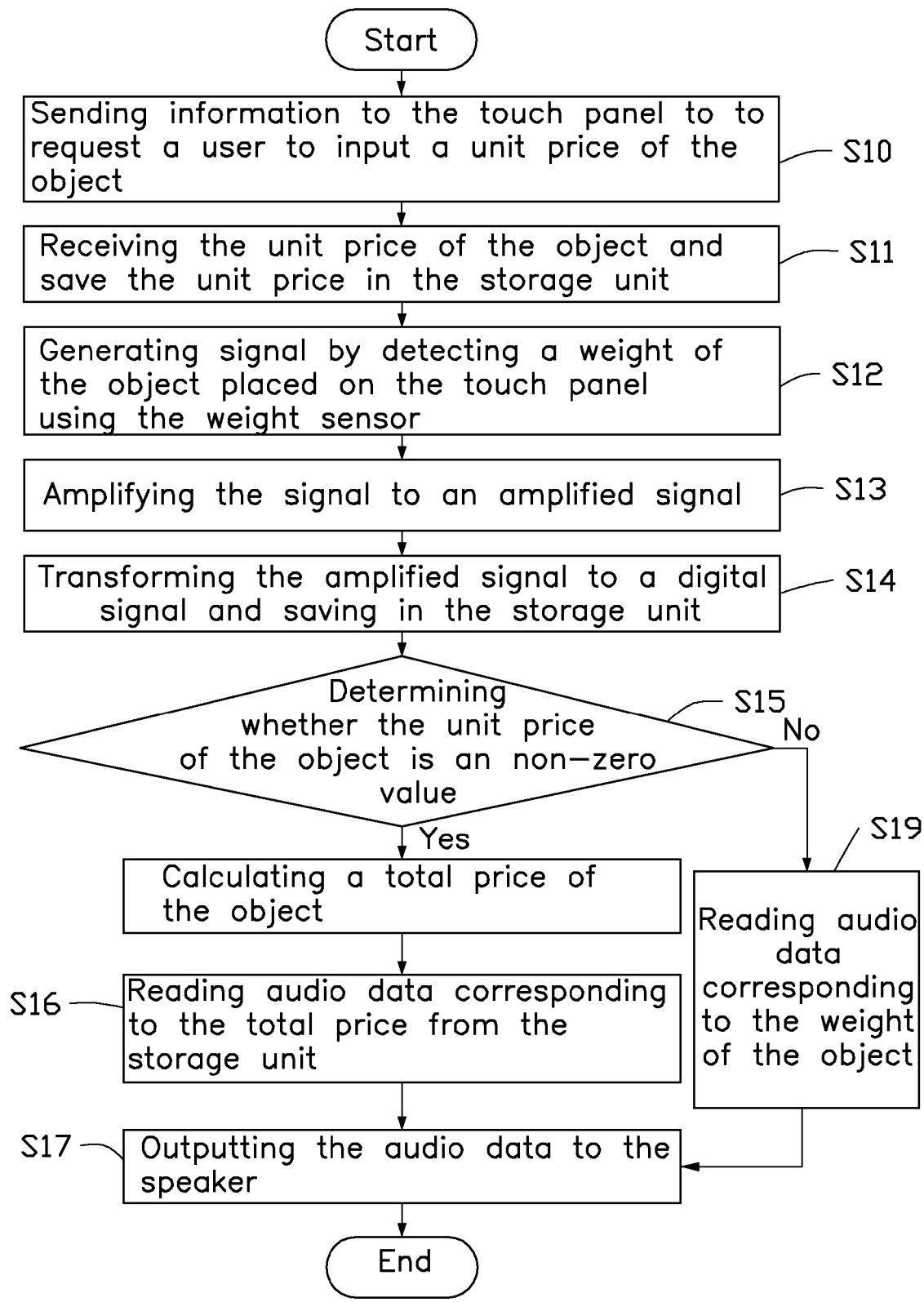
FIG. 2 is a flowchart of one embodiment of a method for measuring weight of an object using a portable electronic device.

FIG. 2 is a flowchart of one embodiment of a method for measuring weight of an object using a portable electronic device 1. Depending on the embodiment, additional blocks may be added, others deleted, and the ordering of the blocks may be changed.

In block S10, the display module 101 sends information to the touch panel 20 of the portable electronic device 1 to request the user to input a unit price of an object. In addition, the display module 101 further sends information to the touch panel 20 to notice the user to place the object on the touch panel 20 to measure.

In block S11, the receiving module 102 receives the unit price of the object input by the user and saves the unit price in the storage unit 80. The receiving module 102 further saves the digital signal from the analog/digital converter 60 in the storage unit 80.

In block S12, the weight sensor 40 detects a weight of the object placed on the touch panel 20. In one embodiment, the weight sensor 40 is a pressure sensor and connects to the touch panel 20. In one embodiment, the object is placed on the touch panel 20 and the pressure sensor detects the weight of the object and generates a corresponding signal indicative of the weight of the object. The pressure sensor then sends the signal to the amplification unit 50.

In block S13, the amplification unit 50 amplifies the signal received from the weight sensor 40. The amplification unit 50 further sends the amplified signal to the analog/digital converter 60.

In block S14, the analog/digital converter 60 transforms the amplified signal to a digital signal. The digital signal is then saved in the storage unit 80 by the receiving module 102.

In block S15, the determination module 103 determines whether the unit price of the object input by the user is a non-zero value. If the unit price of the object input by the user is the non-zero value, the determination module 103 sends a calculation signal to the calculation module 104 and block S16 is implemented. If the unit price of the object input by the user is zero, block S19 is implemented.

In block S19, the read module 105 reads the weight of the object from the storage unit 80. The read module 105 then reads audio data corresponding to the weight of the object from the storage unit 80. The read module 105 outputs the audio file to the speech module 106 and block S18 is implemented.

In block S16, the calculation module 104 calculates a total price of the object. The total price of the object is calculated by a multiplication of the unit price by the weight of the object. In one embodiment, the calculation module 104 further saves the calculated total price of the object in the storage unit 80. In other embodiments, the calculation module 104 can send the calculated total price of the object to the display module 101. The display module 101 then displays the calculated total price of the object on the touch panel 20.

In block S17, the read module 105 reads the total price of the object from the storage unit 80. The read module 105 further reads the audio file corresponding to the total price of the object from the storage unit 80 and outputs the audio file to the speech module 106. For example, the total price of the object read from the storage unit 80 is 150 dollars. The read module 105 reads the audio file corresponding to the 150 dollars from the storage unit 80. Then, the read module 105 outputs the audio file of 150 dollars to the speech module 106.

In block S18, the speech module 106 outputs the audio file received from the read module 105 to the speaker 30.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device, comprising:
   a storage unit;
   a touch panel;
   a speaker;
   at least one processor;
   a weight sensor operable to detect weight of an object placed on the touch panel;
   one or more programs stored in the storage unit and executed by the at least one processor, the one or more programs comprising:
   a display module operable to send information to the touch panel to request a user to input a unit price of the object on the touch panel;
   a receiving module operable to receive the input unit price of the object from the touch panel and save the unit price in the storage unit;
   a determination module operable to determine whether the unit price of the object is a non-zero value and send a calculation signal to execute a calculation when the unit price of the object is a non-zero value;
   a calculation module operable to calculate a total price of the object by multiplication of the unit price by the weight of the object when receiving the calculation signal;
   a read module operable to read audio data corresponding to the total price from the storage unit; and
   a speech module operable to output the audio file to the speaker.

2. The portable electronic device of claim 1, wherein the calculation module further sends the calculated total price of the object to the display module.

3. The portable electronic device of claim 1, wherein the weight sensor is a pressure sensor to generate a signal indicative of the weight of the object.

4. A method for measuring object weight using a portable electronic device, the portable electronic device comprising a touch panel, a weight sensor, a storage unit, and a speaker, the method comprising:
   sending information to the touch panel to request a user to input a unit price of the object on the touch panel;

receiving the input unit price of the object from the touch panel and saving the unit price in the storage unit;

determining the weight of the object placed on the touch panel;

determining whether the unit price of the object is a non-zero value;

sending a calculation signal to execute a calculation when the unit price of the object is a non-zero value;

calculating a total price of the object when receiving the calculation signal;

reading audio data corresponding to the total price from the storage unit; and outputting the audio file to the speaker.

5. The method of claim 4, wherein the step of calculating a total price of the object is accomplished by multiplication of the unit price by the weight of the object upon detecting that the unit price is the non-zero value.

6. The method of claim 5, further comprising sending the calculated total price of the object to be displayed on the touch panel.

7. The method of claim 6, wherein the step of detecting the weight of the object comprises generating a signal indicative of the weight of the object using a pressure sensor.

8. The method of claim 6, further comprising amplifying the signal to an amplified signal.

9. The method of claim 6, further comprising transforming the amplified signal to a digital signal.

10. A non-transitory storage medium having stored thereon instructions that, when executed by a processor, causes the processor to perform a method for measuring object weight using a portable electronic device, the portable electronic device comprising a touch panel, a weight sensor, a storage unit, and a speaker, the method comprising:

sending information to the touch panel to request a user to input a unit price of the object on the touch panel;

receiving the input unit price of the object from the touch panel and saving the unit price in the storage unit;

determining the weight of the object placed on the touch panel;

determining whether the unit price of the object is a non-zero value;

sending a calculation signal to execute a calculation when the unit price of the object is a non-zero value;

calculating a total price of the object when receiving the calculation signal;

reading audio data corresponding to the total price from the storage unit; and outputting the audio file to the speaker.

11. The storage medium of claim 10, wherein the step of calculating a total price of the object is accomplished by multiplication of the unit price by the weight of the object upon detecting that the unit price is the non-zero value.

12. The storage medium of claim 10, wherein the method further comprising sending the calculated total price of the object to be displayed on the touch panel.

13. The storage medium of claim 10, wherein the step of detecting the weight of the object comprises generating a signal indicative of the weight of the object using a pressure sensor.

14. The storage medium of claim 10, wherein the method further comprising amplifying the signal to an amplified signal.

15. The storage medium of claim 10, wherein the method further comprising transforming the amplified signal to a digital signal.

* * * * *